| United States Patent [19] | [11] Patent Number: 4,829,650 |
|---|---|
| Galard | [45] Date of Patent: May 16, 1989 |

[54] METHOD AND APPARATUS FOR TIGHTENING AND/OR SLACKENING BOLTS

[75] Inventor: Michel Galard, Tacoignieres, France

[73] Assignee: EG&G Sealol, France

[21] Appl. No.: 933,484

[22] Filed: Nov. 21, 1986

[30] Foreign Application Priority Data

Nov. 21, 1985 [FR] France .................................. 85 17247

[51] Int. Cl.⁴ ............................................ B23Q 17/00
[52] U.S. Cl. ........................................ 29/407; 29/703; 29/705; 29/240; 29/252; 29/709; 29/720
[58] Field of Search ................. 29/701, 407, 702, 703, 29/705, 720, 240, 252, 709; 73/862.21, 862.22, 862.23; 81/467

[56] References Cited

U.S. PATENT DOCUMENTS

| 3,099,075 | 7/1963 | McDaniels, Jr. et al. | 29/240 |
| 4,047,456 | 9/1977 | Scholz | 81/57.38 |
| 4,520,446 | 5/1985 | Sato | 29/709 X |

Primary Examiner—Timothy V. Eley

[57] ABSTRACT

The invention relates to a method and to apparatus for tightening and slackening bolts by hydraulic tensioning. The apparatus comprises a tightening system (60) applied to the bolts to be tightened and/or slackened, controlled by a central unit (24), via the intermediary of a control device (26) and a hydraulic pump (28). Transducers (19 and 18) permit respectively measurement of the effective strain of the bolt and the pressure effectively applied to the tightening system (60). A correlation between the effective strain of the bolt and the pressure effectively applied is thus effected for obtaining a very good precision of the strain. Application is to mechanical construction in the nuclear environment.

13 Claims, 6 Drawing Sheets

METHOD AND APPARATUS FOR TIGHTENING AND/OR SLACKENING BOLTS

FIELD OF THE INVENTION

The present invention relates to a method of tightening and/or slackening bolts by hydraulic tensioning and to an apparatus for putting this method into operation.

BACKGROUND OF THE INVENTION

The technique of assembly by bolts has always posed and even now poses numerous problems for its users, because of the use of complex pieces or use in severe conditions. The cost of accidents which the failure of this type of assembly is liable to cause is out of all proportion to the intrinsic cost of this technique and therefore justifies the interest which is given to it.

Expertises applied following the failure of bolted assemblies, such as ruptures, leaks at clamps after assembly, show that these failures, for the most part, are due to misappreciation of the load or preload introduced into the assembly in the region of the bolts at the instant of tightening as such.

The preload by tensioning of bolts according to an array of predetermined values, a function of the structure of the assembly, constitute one of the essential parameters of the final assembly. A judicious preload permits the body of the bolt not to work in sheer in the case of forces tangential to the plane of assembly. It also permits ensuring the maintenance of fluid-tightness and conditions the effects of spontaneous slackening, under the action of dynamic sheer forces. Finally, it permits the better use of the mechanical characteristics of bolts, thus permitting a reduction of their diameter and number, in short obtaining an optimalisation of the tightening array and of the assembly. Presently, an integrated system is not available permitting the control in real time of the tension of bolts, according to a pre-determined tightening array, as a function of the structure of the assembly.

THE INVENTION

The present invention has the object of remedying the inconveniences mentioned by the provision of a method and of an apparatus for tightening and/or slackening of bolts in which the operations carried out, in the absence of application of any stress other than a tensile stress, are provided in an entirely automatic manner.

Another object of the present invention is to provide a method and an apparatus for tightening and/or slackening of bolts, in which all the operations, permitting an optimal reduction in the operating time, can be carried out at a remote distance, the apparatus and the method of the invention being thus able to be carried out in a hostile environment, particularly in a nuclear environment.

Another object of the present invention is to provide a method and an apparatus for tightening and/or slackening of bolts entirely automatically, with great reliability and with great precision, all the operations, freed from the factor of human error, in the region of execution, particularly meeting the specifications of the nuclear industry.

The method of tightening and/or slackening of a bolt in which a mechanical stress is applied in order to cause a suitable strain of the bolt and a nut is displaced on the bolt, is remarkable in that, after execution of a first program of verification of the interconnection and the placing of the systems for tightening/slackening on the nut-and-bolt, the method consists in displaying for the operator a table indicative of the initial values of the strains and pressures and of the programmed design values of strain and pressure, testing by a test program for proper functioning, transducers and elements permitting the carrying out of the process of tightening and/or slackening as such, carrying out the tightening/slackening as such, with analysis of the values received by transducers of the strain of the bolt and the pressure applied for causing this strain, the tightening and/or slackening being carried out by servo-control of the strain imposed on the bolt, by a mechanical stress applied to the latter, to a design value and a control being carried out by correlation between the displayed strain and the pressure applied in order to cause the said strain, displaying and memorizing the values of maximum strain and final pressure obtained for the bolt in question, displacing the nut by screwing and/or unscrewing on the corresponding bolt, with respect to the tightening surface and releasing the applied stress.

The apparatus according to the invention permits carrying out of a tightening and/or slackening of a bolt in which a mechanical stress is applied in order to cause a suitable strain of the bolt and a nut is displaced on the bolt with respect to the tightening surface, is remarkable in that it comprises a base concentrically surrounding the nut and taking up abutment on the tightening surface, the base being provided at its part opposite the said surface with an annular jack, on which takes up abutment the collar of a crown fixed to the projecting part of the bolt in a manner such that the annular jack, when it is brought to and held at pressure, displaces the said collar and effects the traction on the bolt via the base. The apparatus according to the invention further comprises a transducer for measurement of the strain of the bolt, arranged on the end of the bolt and of which the output is connected to the control device for pressurizing the annular jack and a transducer for measuring the pressure applied to the annular jack, in a manner to permit control by correlation between the effective strain displayed and the pressure applied, in order to cause the said strain. The output of the transducers of strain and pressure is connected to an automatic control circuit comprising, particularly, a central unit for programming of the predetermined value of the strain of the bolt and a control for placing under stabilisation pressure and for release of the said pressure on the annular jack.

The invention finds application for the carrying out of assembly via bolts in a hostile environment, such as a nuclear environment, in any industry of mechanical construction and of naval construction.

THE DRAWINGS

It will be better understood from reading the description and observing the accompanying drawings, in which:

FIG. 1 shows a general flow chart of the method of the invention, advantageously driven via a microcomputer, this Figure being divided into parts A and B.

THE EMBODIMENT

The method of tightening and/or slackening of a bolt, according to the invention, is a method in which a mechanical stress is applied in order to cause a suitable strain of the bolt and a nut is displaced on the bolt, will now be described in connection with FIG. 1, in accordance with a particularly advantageous embodiment in which, the driving of the method is carried out by means of a microcomputer.

Of course, the apparatus permitting operation of the method of the invention, an apparatus which permits causing the suitable strain of the bolt, then the displacement of the nut on the bolt, is an automated apparatus, which will be described later in the description.

The stages of positioning and verification of interconnection of the systems for tightening and/or slackening on the nut-and-bolt, are initially provided as shown at 1, 2, 3, 4, 5 in FIG. 1. These stages corresponding to other stages such that the hydraulic control systems are connected to the present invented apparatus for tightening and/or slacking bolts (hereinafter referred to as "apparatus"), the apparatus is provided with electric power from a grid, the control programs of the process are loaded into the apparatus by the operator, the data relative to, site references on which the work is to be carried out and the references of the structure of this site on which the assembly operation is to be carried out. This latter operation is carried out by the operator, who enters these different data on a control keyboard of the apparatus. At the stage 5, the machine having registered the previously described data, it permits the display on a screen of prompts from a program of the "menu" type permitting the operator to make a choice between operations described below and referenced A,B,C,D,E.

In accordance with the object of the invention, after execution of a first program of verification of the interconnection and of the positioning in place of the tightening and slackening systems on the nut-and-bolt, operations referenced 6A,6B and 8 in FIG. 1, the method consisting of display for the operator, a table indicative of the initial values of strains and of pressures and of programmed design values of strain and of pressure, to inform the operator. In FIG. 1, this operation is represented at 7. Then a test program for the proper, functioning of the transducers and elements of the apparatus permitting the driving of the process of tightening and-/or slackening as such, permits testing the assembly of members for carrying out the tightening and/or slackening. This operation is represented at 8 in FIG. 1.

The tightening and/or slackening as such is then carried out respectively at 9Z and 10Z in FIG. 1, an analysis of the values received by the transducers measuring the strain of the bolt and of the pressure applied for causing this strain being also carried out respectively at 9A and 10A.

In accordance with the invention, the tightening and-/or slackening is carried out by servo-control of the strain imposed on the bolt by the mechanical stress applied to it to a design value, these operations being referenced respectively 9A,9B,9C,9D and 10A,10B,10C,10D in FIG. 1.

According to an advantageous characteristic of the method of the invention, a control referenced respectively 9D,10D is carried out in the course of driving of the method by correlation between the displayed strain undergone by the bolt and the pressure applied in order to cause this said strain. It will be understood that the correlation effected, consisting of a quasi-permanent control of the ratio, or of the value of this, of the measured strain to the pressure effectively applied for obtaining this strain, permits obtaining a very good precision of values of strain thus obtained, as well as, in the case of test failure for one or more bolts, the indication to the operator of an error message and the return to the initial configuration as appears clearly in FIG. 1. In the absence of test failure, the tightening and/or slackening as such is continued, until the design value of strain is attained, a display and memorisation, referenced 9E,10E in FIG. 1, of the maximum strain and of the final pressure attained for each bolt in question, being then carried out The nut of the corresponding bolt, is then displaced with respect to the tightening surface, in order to carry out the mentioned tightening and/or slackening, by screwing and/or unscrewing on the bolt, on the displayed prompt on the screen of the apparatus by the operator. In FIG. 1, the mentioned prompt referenced respectively 10F and 9F is of course caused by the program of the "menu" type previously mentioned.

In the case where the method of invention is utilised for producing a tightening, as shown in FIG. 1 at 9G, a continuous measurement of residual strain for each of the bolts is further carried out, these measurements being of course able to be memorised.

The mechanical stress ensuring the strain of each of the bolts can then be deleted, as appears in FIG. 1, at 9H and 10H and a report of the tightening and/or slackening can then be printed from the memorised values and identification references previously introduced into the apparatus.

In the case where the method of the invention is used for tightening bolts and where, for any, inadvertent, reason, the strain of the bolt or one of the bolts effectively attained is too low, the method according to an advantageous variant of the invention can also consist, as is shown at 11 in FIG. 1, in carrying out for each of the mentioned bolts concerned, a supplementary control sequence of tightening, the sequence being driven from a sub-program for tightening.

Further, in the presence or absence of the supplementary tightening program, the method of the invention can also comprise a sequence consisting, after a predetermined time permitting the obtaining of a good stabilisation of values of residual strain of the bolts, of carrying out a display, designated 9G, of values of these strains. A tightening report, 9I, can then be printed from all the data displayed and memorised. For a predetermined type of material, it is of course advantageous to safeguard the relative data on tightening, in order to define a corresponding tightening array.

A more detailed description of the method of the invention, when this is utilised essentially for producing slackening, will now be given in relation to FIG. 1.

It will of course be noted that the method of the invention can advantageously be carried out, in order to effect a slackening, when the or each of the bolts has been submitted to any tightening, that is to say to a tightening made by more conventional means, or on the contrary when the suitable tightening has been carried out in accordance with the sequence described and shown at 9 in FIG. 1.

In accordance with the method of the invention, in order to carry out the slackening, the bolt is submitted, at 10D, to a tensile stress at least greater than the residual force to which the bolt is submitted by the tightening. In the case where the bolt in question has preliminarily been submitted to a process of tightening, brought about in accordance with the method of the invention, the residual strain is known, this having been memorised in the course of the sequence of tightening already described. On the contrary, when the tightening has been carried out in another manner, the residual strain is not known or at least is known in an imprecise manner. In the two cases, in order to carry out the slackening, the bolt is submitted to a tensile stress in a manner to cause the release of the nut from the tightening surface.

The operator is then invited on the prompt caused by the program of the "menu" type displayed on the apparatus, to displace the nut with respect to the tightening surface by a predetermined amount of unscrewing. This operation is designated 10F in FIG. 1. The tensile stress can then be released, 10H, a draining of the hydraulic circuits permitting the application of this stress being able to then be carried out at 10Hh.

In an advantageous manner, in the case where the bolt to be slackened has been submitted to a method of tightening according to the method of the invention, the process of slackening as such can consist of submitting the bolt or bolts in question substantially to defined stages and utilised for the tightening, but of course in the reverse order. Thus, after execution of the first program referenced 6A,6B and 8 in FIG. 1, of verification of the interconnection and of placing of the systems for slackening on the nut-and-bolt, the method, in order to carry out a slackening, can consist of displaying at 7 for the operator a table indicative of the initial values of strains and pressures and programmed design values of strain and pressure. A program then permits testing at 8 the proper functioning of the transducers and element permitting the driving of the process of slackening as such. The slackening as such is carried out at 10, with analysis of the received values referenced 10Z from the transducers for strain and pressure, the effective slackening at 10A,10B,10C,10D is carried out by servo-control of the strain imposed on the bolt by the stress applied to the design value and a control is carried out by correlation between the mechanical stress exerted and the pressure applied in order to exert this stress. The values of maximum strain applied for the release of the nut from the tightening surface and the final pressure obtained for each bolt can be displayed and memorised and the nut can be displaced with respect to the tightening surface, by a predetermined quantity by unscrewing. The tensile stress is then released.

The method according to the invention permitting the carrying out of a tightening and/or slackening of one or several bolts in which a mechanical stress is applied in order to cause a suitable strain for the bolt and a nut is displaced on the bolt with respect to the tightening surface, will now be described in connection with FIGS. 2 to 6.

Figure 2:
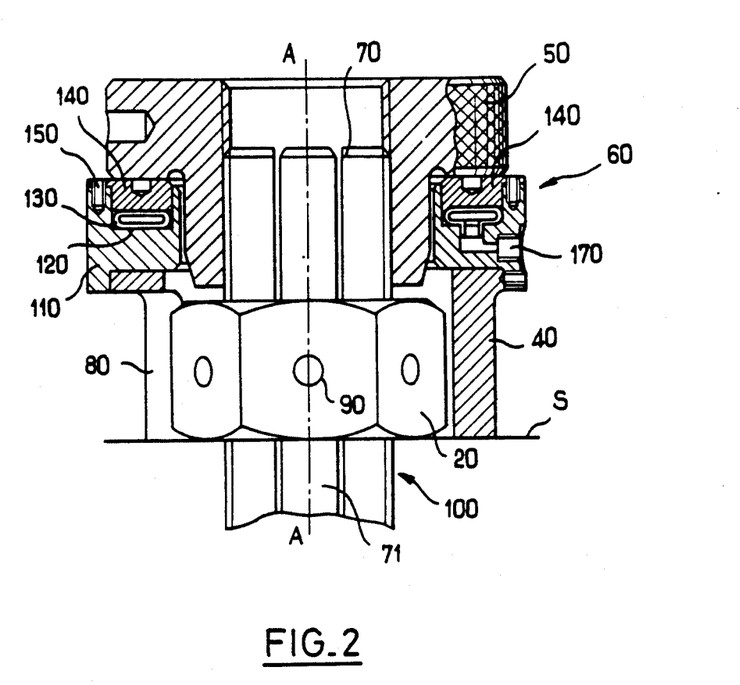
FIG. 2 shows, in longitudinal section, an embodiment detail of one of the means of the apparatus of the invention.
Figure 3:
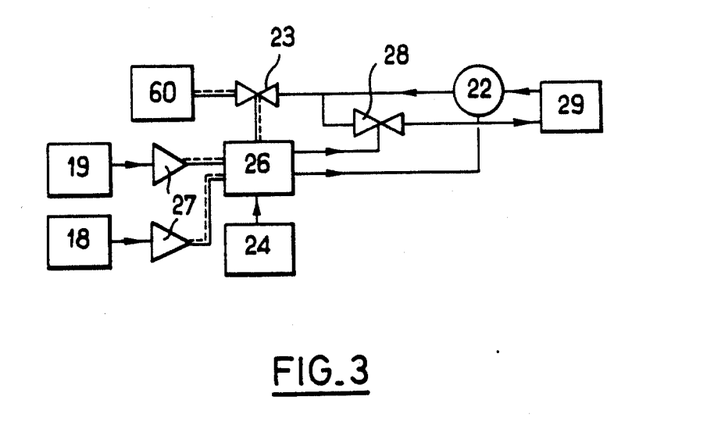
FIG. 3 shows a general circuit diagram of the apparatus, for putting into operation the method of the invention.

In accordance with the mentioned Figures, the apparatus of the invention comprises a system for tightening referenced 60 in FIGS. 2 and 3. The tightening system comprises, by way of non-limitative example, as shown more particularly in FIG. 2, a base 40 concentrically surrounding the nut, designated 20, and taking up abutment against the tightening surface designated S. The base 40 is provided with annular jack 130 at its end opposite from surface S, on which takes up abutment the collar 50 of a crown rigid with the projecting part 70 of the bolt 100. Preferably, the bolt 100 is also provided with a central measuring rod designated 71, which takes up abutment on the base of the bolt and is thus not submitted to the tension. The annular jack 130 comprises an hydraulic feed port designated 170 and is engaged in the body of the jack 110, in a manner to move a piston in the form of a circular crown 140, guided by displacement in translation guides 150 in a direction parallel to the axis of longitudinal symmetry AA of the bolt. The annular jack 130 is engaged in a circular groove 120 arranged in the body of the jack 110 and is adapted to transmit the pressure force to the collar 50, which is engaged by screwing on the projecting end 70 of the bolt. The nut 20 is provided for example with orifices 90 permitting the operator to carry out the screwing and/or unscrewing of the nut on the bolt, with the aid of any suitable means. When the annular jack 130 is brought to and maintained at pressure, this displaces the collar 50 and causes the tensioning of the bolt via the intermediary of the base. An opening 80 in the body of the base 40 permits the operator to carry out the screwing and/or unscrewing of the nut 20, the design value of the strain of the bolt being attained.

In accordance with the apparatus of the invention shown in FIG. 3, the measuring devices incorporated in the apparatus, shown in FIG. 2, comprise a detector 19 for measurement of the strain of the bolt 100 arranged on the end of this and of which the output is connected to a control device pressurised from the annular jack designated 26. The device further comprises, in a particularly advantageous manner, a transducer designated 18, for measuring the pressure applied to the annular jack 130, also connected to the control device 26. In an advantageous manner, as has been described in relation to the method of the invention, the transducer 18 control by correlation between the effective strain displayed and the pressure applied to the annular jack 130, in order to cause the desired strain. The output from the transducers for strain 19 and pressure 18 is connected, via the intermediary of the control device 26, to an automatic control circuit particularly comprising a central unit 24 for programming the predetermined value of strain of the bolt, and control of the pressurisation for stabilisation and for release of the pressure on the annular jack.

According to FIG. 3, the automatic control circuit has been shown as constituted by way of example, by a high pressure pump designated 22, feeding the tightening system 60 at the hydraulic port 170, via the intermediary of an electro-valve 23, the electro-valve and the pump 22 being controlled by the control device 26. Further, a drain electro-valve 28 has been provided in order to permit, particularly, the emptying of the hydraulic circuits and of the annular jack 130, at the end of the sequence of tightening and/or slackening. The drain electro-valve 28 is connected to a reservoir intended to receive the fluid under pressure, the reservoir designated 29, being further connected in return to the pump 22. Amplifiers 27 permit, after amplification of signals delivered by the transducers 18 and 19, a power control of hydraulic members, via the intermediary of the control device 26.

Figure 4:
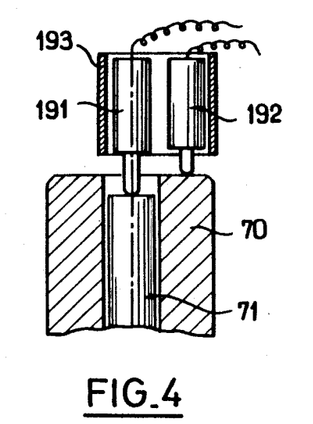
FIG. 4 shows a particularly advantageous variant of the means for measuring strain shown in FIG. 3.

According to a particularly advantageous characteristic of the method of the invention, the transducer 19 for measuring strain comprises two transducers designated 191 and 192 in FIG. 4, these transducers being paired. By paired transducers, is intended transducers of the same type, having substantially identical characteristics of displacement or strain/signal calibration, the mentioned transducers advantageously being able to come from the same manufacturing batch. One of the transducers is in contact with the central part of the bolt 100, the measuring rod 71, and the other transducer is in contact with the upper surface of the projecting end 70 of the bolt. The two transducers 191 and 192 are arranged in a manner so that the differential measurement of indications of strain of the two transducers represents the actual strain of the bolt with respect to the measuring rod. As further shown in FIG. 4, the two transducers 191 and 192 are mechanically connected and thermally coupled by a protection 193, so that the transducers are simultaneously submitted to any possible variation of temperature.

Figure 5:
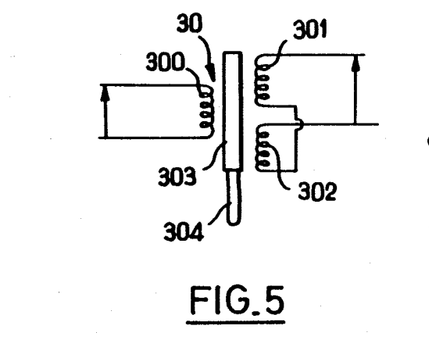
FIG. 5 shows a particularly advantageous embodiment, as regards the electrical part, of the means shown in FIG. 4.

According to another advantageous characteristic of the invention, the transducers 191 and 192 are thermally compensated. For this, as shown in FIG. 5, the transducers 191 and 192 can be constituted by a transformer 30 provided with a primary winding 300, and two secondary windings 301 and 302, identical and in opposition, but connected in series, the transformer 30 comprising in addition a plunging core designated 303, rigid with a contact finger designated 304. The primary of the transformer 30 is fed with alternating current, at low voltage for example. The displacement of the plunging core 303 permits variation of the coupling of the primary and of the secondary giving to the secondary a voltage representative of the displacement of the contact finger 304 and thus the strain of the bolt, the signal given by the transducer 191 serving as a reference to the measurement of this strain.

Figure 6:
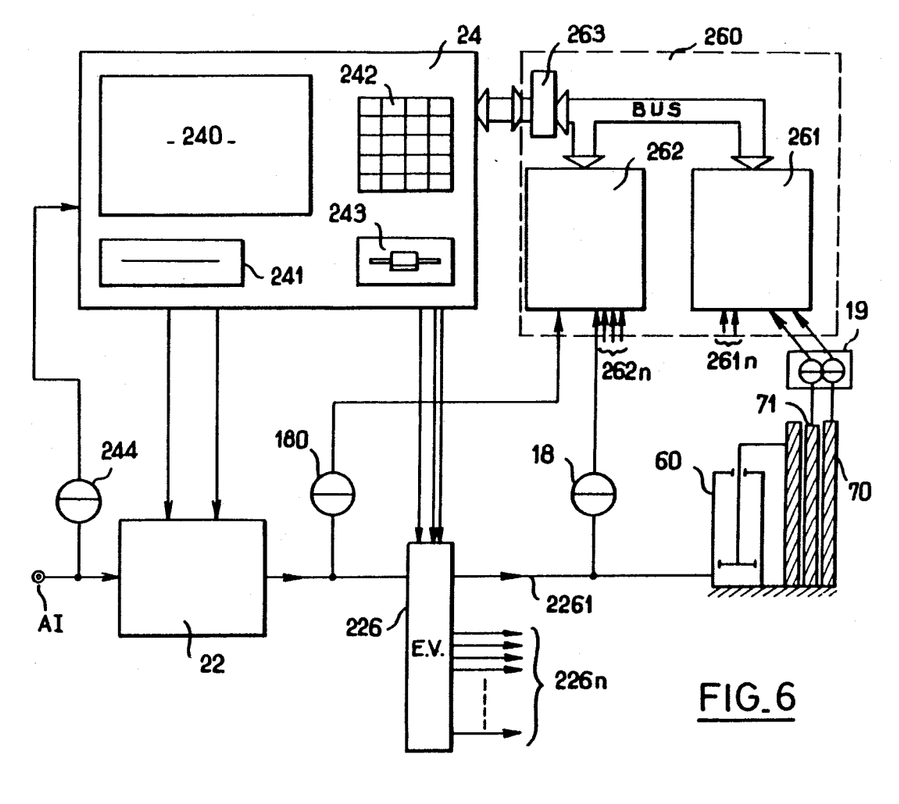
FIG. 6 shows a circuit diagram for the layout of the apparatus of the invention.
Figure 11:
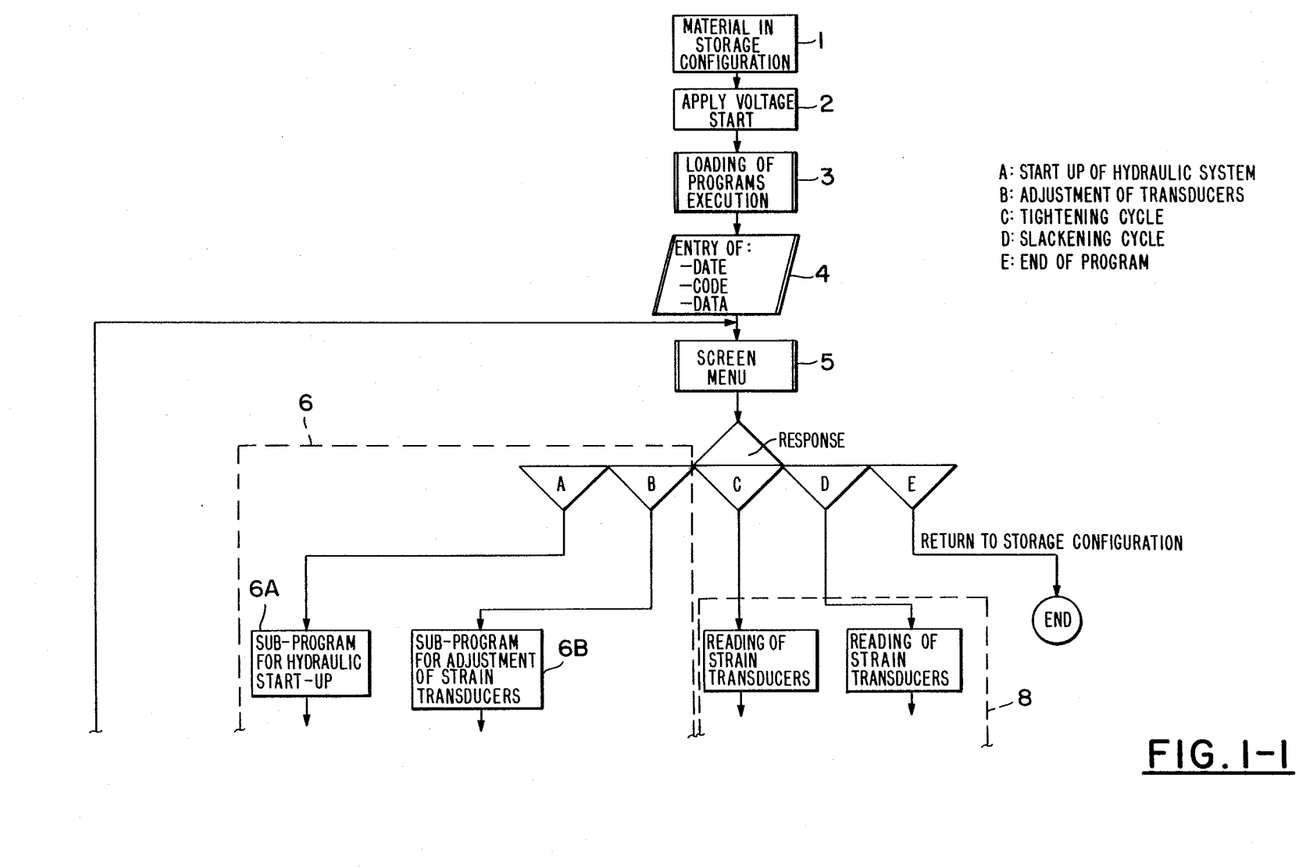

A more detailed description of the layout of constituents of the device according to the invention, as shown in FIG. 3, will now be given in connection with FIG. 6.

In accordance with this Figure, the transducers 18 and 19 are connected to a central unit, via a measuring station 260 of strains and pressures, the measuring station 260 being able to be positioned in the control device 26 shown in FIG. 3. The measuring station for strains and pressures 260 can comprise as shown in FIG. 6, a measurement card 261 for strains, to which are connected the strain measurement transducers 19, a single transducer relating to a bolt 70 being shown in FIG. 6, the other transducers, relative to other bolts, being able to be connected to other inputs referenced 261n. In this same FIG. 6, the system of tightening 60 is shown symbolically connected to an assembly of a hydraulic control 226 comprising a plurality of hydraulic valves, one valve being able to control the tightening system 60 by a duct designated 2261, and the other systems of tightening, relative to other bolts and not shown in FIG. 6, being able to be controlled by outputs designated 226n of the control assembly 226. The measuring station 260 comprises in addition a measurement card 262 for pressure, to which is connected the pressure measurement transducers 18. In FIG. 6, a single pressure measurement transducer 18 is shown, the other transducers relative to the measurement of pressure applied to the tightening system 60 associated to other bolts, not being shown. These other transducers 18, can of course be connected to inputs 262n of the card 262.

Further, a pressure transducer 180 permits measurement of the pressure effectively available, at the outlet from the pump 22, the transducer being connected to a particular input, not referenced, of the card 262 and permitting the control of the functioning of the hydraulic pump 22. A transducer 244 permits also measurement of the feed pressure of the pump 22 with hydraulic fluid, this feed being carried out by an input bus AI. By way of non-limitative example, the pressure transducers 18,180 and 224 can be constituted by bridge mounted strain gauges and suitably submitted to the pressure of the fluid considered.

By way of non-limitative example, each of the measurement cards 261 and 262 can comprise sampling means for analog-to-digital conversion, dispatching the signals generated by the mentioned strain and pressure measurement transducers, in digital form. A multiplexer 263 is also provided, in a manner to permit, from the central unit 24 a sequential reading of mentioned numerical values, the multiplexer 263, the central unit 24 and the measurement cards 261 and 262 being connected by a BUS type connection.

Of course, the central unit 24 comprises in a non-limitative manner peripheral units such as for example a keyboard 242, a printer 241, a visualisation screen 240 and a magnetic disk reader 243. The central unit 24 is of course connected to the pressure transducer 244 via the intermediary of for example an analog-to-digital converter and a series connection port of the type RS232, or similar, to the control assembly 226, via the intermediary of a power control card for valves not shown on the card, as well as the hydraulic pump 22, for control of this. In an advantageous manner, the central unit 24 comprises a permanent memory, permitting the driving of the method, according to the invention, in accordance with the previously described sequences.

Of course, the permanent memory can be constituted by the mentioned magnetic disks on which the program of the "menu" type already described is recorded. It can equally, in a preferred manner, but non-limitative, be constituted by an electrically programmable read-only memory EPROM, directly positioned on the mother card of the central unit.

Preferably but in a non-limitative manner, the permanent memory is programmed in a manner to permit the driving of the method according to the following non-limitative sequences:

display, for the operator, of a table indicative of the initial values of strains and pressures and of the programmed design values of strain and pressure, test by a test program for proper functioning of the transducers and elements permitting the driving of the process of tightening and/or slackening as such, with analysis of the values received from the transducers of strain of the bolt and pressure applied for causing this strain, the tightening and/or slackening being carried out by servo-control of the strain imposed on the bolt, by a mechanical stress applied to this, to a design value and a control being carried out by correlation between the displayed strain and the pressure applied in order to cause the said strain, display and memorisation of the values of maximum strain and final pressure obtained for the bolt in question, displacement of the nut on the corresponding bolt, by screwing and/or unscrewing, with respect to the tightening surface, release of the stress applied.

Of course, the permanent memory can advantageously be programmed in a manner also to comprise any complementary program or sub-program, permitting the progression of the method according to the invention, in accordance with the previously described flow chart of FIG. 1.

The method and apparatus according to the invention have been put into operation, after production, and have given total satisfaction. Thus, assemblies have been able to be made with very different tightening arrays, as a function of the structure of the pieces to be assembled, the residual strain of the bolts having effectively been obtained with a precision of ±0.005 mm. Such a degree of precision associated with a high degree of automisation, as regards the method of the invention and of the previously described apparatus, has been able to be obtained because of simultaneous control and corresponding correlation between the variation of strain and pressure effectively applied to the tightening means, by two autonomous servo-control systems, the high degree of precision already mentioned with relation to the strain, being in addition stable over a wide range of temperatures as a result of the particular structure of the transducers. Of course, the servo-control of the strain or the pressure applied for obtaining this can equally be utilised for the driving of the method of the invention, the second independent servo-control serving then for reference for the first for carrying out the mentioned correlation.

The method and apparatus of the invention on account of the very high degree of precision of production of the residual strain of the bolts are particularly adapted to use in the field of the nuclear industry and in particular for vessel tightening, the tightening of manholes and the tightening of heat exchangers as well as any slackening.

I claim:

1. A method of tightening and/or slackening of a bolt, in which a mechanical stress is applied in order to cause a suitable strain of said bolt and a nut is displaced on said bolt, wherein after execution of a first program of verification of interconnection and positioning of tightening/ slackening systems on a nut-and-bolt said method consists in:
    displaying, for an operator, a table indicative of initial values of strain and pressures and programmed design values of strain and pressure,
    testing via a test program for proper functioning of transducers and elements permitting of a process of tightening and/or slackening as such,
    carrying out said tightening and/or slackening as such with analysis of values received from said transducers of strain of said bolt and of pressure applied for causing said strain, said tightening and/or slackening being carried out by servo-control of said strain imposed on said bolt via a mechanical stress applied to the latter, to a design value and a control being carried out by correlation between said display strain and said applied pressure in order to cause said strain,
    display and memorisation of values of maximum strain and final pressure obtained for said bolt in question,
    displacing said nut by screwing and/or unscrewing with respect to a tightening surface on said corresponding bolt,
    releasing said applied stress.

2. A method according to claim 1, wherein in a case where said strain of said bolt effectively attained, in the course of said tightening, is too weak, said method consists in:
    effecting for each of said bolts a supplementary controlled tightening,
    after a predetermined time, for good stabilisation of values of residual strain for said bolts, effecting display of said values of strain,
    printing a tightening report from all displayed and memorised data,
    safeguarding, for a predetermined type of material said data relating to said tightening in order to define a corresponding tightening array.

3. A method according to claim 1, wherein, when said bolt has been submitted to any tightening and in order to carry out a slackening, said method consists in:
    submitting said bolt to a tensile stress, at least greater than residual force to which said bolt is submitted by said tightening, in order to cause release of said nut from said tightening surface,
    displacing said nut with respect to said tightening surface with a predetermined amount by unscrewing,
    releasing said tensile stress.

4. A method according to claim 3, wherein said bolt to be slackened having been submitted to a method of tightening according to claim 1, said method consisting of submitting said bolt substantially to said stages of tightening but in reverse order.

5. A method of tightening according to claim 4, wherein, after execution of a first program of verification of interconnection and positioning of said systems for slackening of said nut-and-bolt, in order to carry out a slackening, said method consists of:
    displaying, for said operator, a table indicative of the initial values of train and of pressures and said programmed design values of strain and pressure,
    testing by a test program for proper functioning of said transducers and elements permitting driving of said process of slackening as such,
    carrying out said slackening as such with analysis of values received from said transducers of strain and pressure, said slackening being carried out by servo-control of said strain imposed on said bolt by said stress applied to said design value and a control being carried out by correlation between said mechanical stress exerted and said pressure applied in order to exert said stress,
    displaying and memorising maximum values of strain applied to release said nut from said tightening surface and of final pressure obtained for each bolt,
    displacing said corresponding nut with respect to said tightening surface by a predetermined amount by unscrewing,
    releasing of said tensile stress.

6. An apparatus for the tightening and slackening of a bolt, wherein a mechanical stress is applied in order to cause a suitable strain of said bolt and a nut is displaced on said bolt with respect to a tightening surface, said apparatus comprises:
    means including an annular jack for tightening and slackening said bolt;
    a control device for pressurizing said annular jack;
    a transducer for measurement of said strain of said bolt arranged at an end of said bolt and of which the output is connected to said control device for pressurizing said annular jack;

a transducer for measurement of pressure applied to said annular jack in a manner to permit a control by correlation between effective strain and said pressure applied, wherein said pressure applied causes said strain of said bolt; and an automatic control circuit to which the output of said transducers for strain and pressure is connected, said automatic control circuit comprising particularly:

a central unit for inputting a predetermined value of said strain of said bolt and for controlling the pressurization, stabilization and release of said pressure on said annular jack.

7. An apparatus according to claim 6, wherein said tightening means further comprise:

a base concentrially surrounding said nut and taking up abutment on the same surface which said nut tightens;

said base being provided with said annular jack at its end opposite from said surface a crown which is fixed to a projecting port of said bolt, wherein the collar of said crown takes up abutment on said annular jack;

whereby said annular jack, when it is submitted to an held at pressure, displaces said collar and causes tension in said bolt via said base.

8. Apparatus according to claim 6, wherein said transducer for measurement of strain comprises two paired transducers, one of the transducers being in contact with a central part of said bolt and the other transducer being in contact with an upper face of said bolt, said two transducers being arranged in such manner that the difference between the measurements of strain from said two transducers represents said actual strain of said bolt.

9. Apparatus according to claim 8, wherein said two transducers are mechanically connected and thermally coupled.

10. Apparatus according to claim 8, wherein said transducers are constituted by a transformer provided with a primary winding, two identical opposed secondary windings connected in series, and a plunging core mechanically fixed to a contact finger.

11. Apparatus according to claim 8, wherein said transducers are connected to said central unit via a station for measurement of strains and pressures, said station for measurement of strains and pressures comprising:

a first measurement card for strain to which are connected said strain measurement transducers;

a second measurement card for pressure t which are connected said pressure measurement transducers; and a multiplexer for sequential reading of signals generated by said transducers;

wherein each of first and second said measurement cards provide a sampling means for analog-to-digital-conversion whereby the analog signals generated by said two transducers is converted to digital signals and lead into said multiplexer for sequential reading.

12. Apparatus according to claim 11, wherein said central unit comprises:

a display coupled to said central unit, for an operator, of a table indicative of initial values of strains and pressures and of programmed design values of strain and pressure;

a permanent memory coupled to said central unit for storing values of maximum strain and final pressure obtained for said bolt;

a keyboard coupled to said central unit for input of said predetermined value of strain of said bolt; and a test program for proper functioning of said apparatus for tightening and/or slackening of a bolt as such with analysis of said values received from said transducers of strain of said bolt and of pressure applied to cause said strain, said tightening and/or slackening being carried out by servo-control of strain imposed on said bolt, via a mechanical stress applied to the latter, to a design value and a control being carried out via correlation between said display strain and said pressure applied in order to cause said strain.

13. Apparatus according to claim 12, wherein said permanent memory is constituted by an electrically programmable read-only memory.

* * * * *